(12) United States Patent
Konrad et al.

(10) Patent No.: US 9,874,864 B2
(45) Date of Patent: Jan. 23, 2018

(54) METHOD FOR PRODUCING STRUCTURES OR CONTOURS ON A WORKPIECE, AND MOULDER

(71) Applicant: Michael Weinig AG, Tauberbischofsheim (DE)

(72) Inventors: Andreas Konrad, Lauda-Königshofen (DE); Jürgen Schmidt, Werbach (DE)

(73) Assignee: Michael Weinig AG, Tauberbischofsheim (DE)

( * ) Notice: Subject to any disclaimer, the term of this patent is extended or adjusted under 35 U.S.C. 154(b) by 680 days.

(21) Appl. No.: 14/386,422

(22) PCT Filed: Mar. 15, 2013

(86) PCT No.: PCT/EP2013/000801
§ 371 (c)(1),
(2) Date: Dec. 22, 2014

(87) PCT Pub. No.: WO2013/139458
PCT Pub. Date: Sep. 26, 2016

(65) Prior Publication Data
US 2015/0142167 A1 May 21, 2015

(30) Foreign Application Priority Data
Mar. 20, 2012 (DE) .......................... 10 2012 006 124

(51) Int. Cl.
*G06F 19/00* (2011.01)
*G05B 19/19* (2006.01)
(Continued)

(52) U.S. Cl.
CPC ......... *G05B 19/19* (2013.01); *B23Q 17/2233* (2013.01); *B27C 1/08* (2013.01);
(Continued)

(58) Field of Classification Search
None
See application file for complete search history.

(56) References Cited

U.S. PATENT DOCUMENTS

| 4,424,569 A | * | 1/1984 | Imazeki | G05B 19/4166 |
| | | | | 318/567 |
| 5,933,353 A | * | 8/1999 | Abriam | G05B 19/4097 |
| | | | | 700/171 |

(Continued)

FOREIGN PATENT DOCUMENTS

| DE | 87 14 080 | 12/1987 |
| DE | 196 16 165 A1 | 10/1997 |

(Continued)

*Primary Examiner* — Wissam Rashid
(74) *Attorney, Agent, or Firm* — Gudrun E. Huckett (57) ABSTRACT

In a molder, at least one rotatably driven tool (7, 8, 10, 11) is used to produce the structure (27) or contour on the workpiece (1) by workpiece removal. The workpiece positions along the workpiece (1) for producing the structure or contour are set depending on the data of the workpiece (1) and of the tool (7, 8, 10, 11). The data are transmitted to the machine controller which processes the CNC program based on the data during the passage of the workpiece (1) through the molder and moves the tool (7, 8, 10, 11) into the required positions via CNC drives depending on the workpiece position. The workpiece position is sensed during the passage of the workpiece (1) through the molder. In order to sense the workpiece position in the molder, at least one measuring element (18) is provided upstream and downstream of the tool (1), said measuring element (18) being connected to the machine controller and supplying signals that describe the advancing travel of the workpiece (1) to the machine controller. By way of the machine controller, the tool (7, 8, 10, 11) is moved into the respective tool positions in accordance with the signals.

20 Claims, 6 Drawing Sheets

(51) Int. Cl.
*B27C 1/08* (2006.01)
*B27C 5/02* (2006.01)
*B27M 1/08* (2006.01)
*G05B 19/18* (2006.01)
*B23Q 17/22* (2006.01)

(52) U.S. Cl.
CPC ............... *B27C 5/02* (2013.01); *B27M 1/08* (2013.01); *G05B 19/182* (2013.01); *G05B 2219/37304* (2013.01); *G05B 2219/37575* (2013.01); *G05B 2219/37576* (2013.01); *G05B 2219/45229* (2013.01)

(56) References Cited

U.S. PATENT DOCUMENTS

| | | | |
|---|---|---|---|
| 2001/0017169 A1 | 8/2001 | Englert | |
| 2004/0177896 A1* | 9/2004 | McGehee | ............ B27C 1/12 144/114.1 |
| 2005/0246052 A1* | 11/2005 | Coleman | ......... G05B 19/40937 700/188 |

FOREIGN PATENT DOCUMENTS

| | | |
|---|---|---|
| DE | 197 51 514 A1 | 5/1999 |
| DE | 197 56 503 A | 6/1999 |
| GB | 1 413 106 A | 11/1975 |

* cited by examiner

METHOD FOR PRODUCING STRUCTURES OR CONTOURS ON A WORKPIECE, AND MOULDER

BACKGROUND OF THE INVENTION

The invention concerns a method for producing structures or contours on a workpiece in which in a moulder with at least one rotatably driven tool the structure or contour is produced by workpiece removal on the workpiece. The invention also concerns a moulder, in particular for performing such a method, comprising at least one transport path for the workpieces, along which the workpieces are transported through the moulder for machining, and comprising rotatably driven tools of which at least one tool is provided for producing a structure or contour in the workpiece.

It is known to produce by means of a tool on the surface of a workpiece structures, also referred to as relief surface. In this context, the tool is adjusted in at least two directions relative to the workpiece.

The invention has the object to design the method according of the aforementioned kind and the moulder of the aforementioned kind such that, in a simple way, the desired structures or contours can be produced on the workpiece with high precision and reliably.

SUMMARY OF THE INVENTION

This object is solved for the method of the aforementioned kind in accordance with the invention in that, as a function of the data of the workpiece and of the tool, the tool positions along the workpiece for generating the structure or contour are defined and the data are transmitted to the machine controller, which executes the CNC program that is based on the data during passage of the workpiece through the moulder and adjusts the tool into the required positions by CNC drives as a function of the workpiece position, and in that the workpiece position is detected upon passage of the workpiece through the moulder. The object is solved for the moulder of the aforementioned kind in accordance with the invention in that, for detecting the workpiece position in the moulder, in front of and behind the tool at least one measuring element is provided that is connected to the machine controller and supplies signals that describe the feeding travel of the workpiece to the machine controller, with which, in accordance with the signals, the tool is adjusted into the respective tool positions.

In the method according to the invention, the tool positions along the workpiece for producing the structure or contour are determined as a function of the data of the workpiece and of the tool. The data are transmitted to the machine controller which executes the CNC program based on these data during workpiece passage through the moulder. As a function of the workpiece position, the tool is adjusted in the feeding direction into the required positions in order to obtain the desired structure or contour on the workpiece. By means of the workpiece data, tool data, and tool position data, any structure or contour on the workpiece can be produced. Workpiece data are, for example, the length, the width, and the thickness of the workpiece.

As data of the tool, advantageously the data that determine the contour or the profile of the tool can be input and saved. The tool, depending on the kind and/or shape of the structure or contour of the workpiece, can have different contours or profiles.

A reliable and precise generation of the structure or contour results when the tool positions of the tool are determined and preset in fixed steps along the workpiece. In this way, appropriate workpiece positions can be defined and saved, for example, in millimeters steps, respectively. In this way, the structures or contours can be produced very precisely.

Advantageously, the tool positions are determined for circumferential milling in axial and/or radial direction of the tool. The axial position of the tool indicates at which location transverse to the feeding direction, i.e., relative to the width of the workpiece, the tool machines the workpiece. The radial position value indicates how deep the tool penetrates into the workpiece. In case of tool profiles that are V-shaped or circular segment-shaped, the structure is the wider the greater the penetration depth. When the tool penetrates only little into the workpiece, then the structure is correspondingly narrow. Accordingly, by means of the axial tool position, the position of the structure on the workpiece, and by the radial tool position, the depth and optionally the width of the structure can be set.

It is advantageously possible to predetermine and save also the angular position of the tool in two planes relative to the feeding direction of the workpiece. In the simplest case, the axis of rotation of the tool is perpendicular to the feeding direction and parallel to the surface of the workpiece to be machined. When the axis of rotation, on the other hand, is positioned at an angle deviating from 90° relative to the workpiece feeding direction or deviating from 0° relative to the surface, further effects of the structure or contour can be achieved.

A precise control and thus production of the structure or contour results when the tool is adjusted, as a function of the workpiece position, by CNC drives into the required axial and/or radial positions that are determined by the program as the workpiece passes through the moulder.

The workpiece position in the moulder is advantageously detected by at least one sensor. It can be, for example, part of a photoelectric barrier with which, for example, the leading end of the workpiece can be detected.

The signal of the sensor is advantageously utilized as a reference for the position detection of the workpiece by at least one measuring element. The method according to another embodiment is characterized in that several measuring elements are employed in the moulder for position detection of the workpiece. Their measured values are transmitted in a cascade fashion. For example, the first measuring element detects the position of the workpiece. At the latest when the workpiece leaves the detection area of this first measuring element, the latter transmits its measured values to the next measuring element that now, based on the received measured values, continues to detect the position values of the workpiece. When the workpiece, as it passes through the machine, leaves also the detection area of this measuring element, the latter transmits in turn its incremented values to the following measuring element at the latest at this point in time. In this way, the cascading transmission of the measured values is realized. This measured value handover or transducer changeover can be realized already when the workpiece reliably has reached the detection area of the downstream measuring element, at the latest however when it leaves the detection area of the preceding measuring element.

In a preferred embodiment, depending on the position of the workpiece relative to the machining spindles of the tools and the measuring elements, the optimally suitable measuring element is respectively utilized as active measuring element.

In this context, the measured values of the selected active measuring elements are utilized advantageously as reference variable for the axis adjustments of the respective tool.

A particularly advantageous method results when the data of the workpiece and of the tool are detected and are saved together with the tool position data determined across the length of the workpiece, wherein the generation of the structure or contour is performed in a simulation process with the saved data and wherein, after completion of simulation, the saved data are transmitted to the machine controller. The structure or contour generation is simulated first in a computer. In this way, it can be checked without problem whether the desired structure or contour is obtained. During the simulation process, the required corrections, in particular changes of the workpiece-related tool position data, can be carried out. Only when the computer simulation was successful and the simulated structure or contour matches the desired structure or contour and the machine parameters, such as maximum adjusting speed or adjusting acceleration, are complied with, the saved data are transferred to the machine controller. As a result of the preceding simulation, material expenditure is thus kept small because the desired structuring or contour on the workpiece is produced already upon passage of the first workpiece.

The moulder according to the invention is characterized in that the workpiece position in the moulder is detected in front of and downstream of the tool with the measuring element so that, as a function of the respective workpiece position, the tool can be adjusted into the defined axial and/or radial positions. The measuring element provides signals that describe or characterize the feeding travel of the workpiece to the machine controller. In this way, it is ensured that the tool is adjusted precisely into the respective positions when the workpiece has reached the precisely predetermined position relative to the tool.

In a simple and advantageous embodiment, the measuring element is a measuring roller which is contacting the workpiece upon its feeding movement through the moulder. As a result of the immediate contact between the measuring element and the workpiece, the workpiece position can be precisely determined.

In a preferred embodiment, the measuring roller is rotatably driven by the workpiece itself upon its feeding movement through the moulder.

Advantageously, the measuring element is provided with a rotary encoder which encodes the revolutions of the measuring roller into signals that are supplied to the machine controller.

Advantageously, the measuring roller is resting under pressure on the workpiece so that slipping between measuring roller and workpiece is avoided.

The measuring element is advantageously provided in a carrier that is adjustable transverse to the feeding direction of the workpiece. Accordingly, the measuring element can be adjusted such that it first projects somewhat past the workpiece and when it is engaged by the workpiece it is lifted or returned by it against a counterforce. In this way, it is ensured that the measuring element is reliably in contact with the workpiece. Moreover, in this way, the measuring element can be simply adjusted to different widths or thicknesses of the workpiece, as needed.

The adjustment of the carrier is advantageously detected by at least one sensor.

In an advantageous embodiment, along the transport path of the workpieces several measuring elements are provided, positioned at a spacing behind each other in the feeding direction of the workpiece through the moulder. By means of them, the position of the workpiece as it passes through the moulder can be reliably detected.

It is advantageous in this context when the measuring elements are signal-connected to each other by cascading. In this way, the measuring elements can transmit their measured values to the next measuring element, respectively.

Advantageously, the workpiece position in the moulder is detected by at least one sensor.

The invention results not only from the subject matter of the individual claims but also by all data and features disclosed in the drawings and in the specification.

They are claimed as being essential to the invention, even though they may not be subject matter of the claims, inasmuch as they are novel relative to the prior art individually or in combination.

Further features of the invention result from the additional claims, the specification, and the drawings.

BRIEF DESCRIPTION OF THE DRAWINGS

The invention will be explained in more detail with the aid of an embodiment illustrated in the drawings. It is shown in:

FIG. 8 and

FIG. 9 two different surface patterns on a workpiece;

FIG. 10 in schematic illustration two tools with which a contour on the workpiece can be produced.

DESCRIPTION OF PREFERRED EMBODIMENTS

With the moulder described in the following and the disclosed method, different structures can be introduced into the surface of a workpiece of wood, plastic material and the like, or the workpiece can machined with different longitudinal contours. These structures or contours can have any shape and can be freely defined while observing possible limits of individual machine parameters. The structure is produced upon passage of the workpiece through the machine.

The moulder has a CNC control unit and CNC controlled tool axes.

Figure 1:
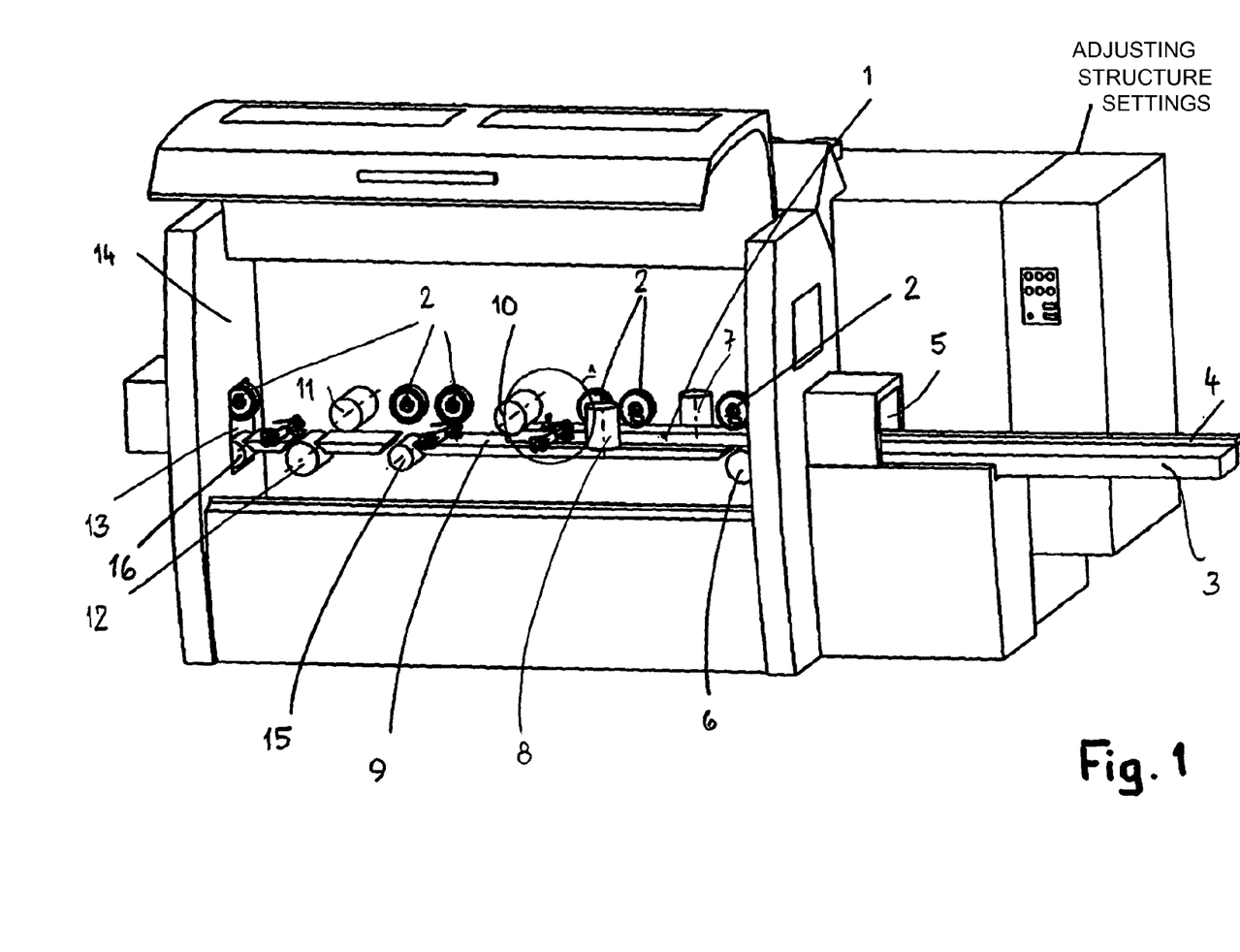
FIG. 1 a machine according to the invention in a front view.

The moulder according to FIG. 1 is a milling machine for four-sided machining of workpieces of wood, plastic material and the like, in which longitudinal workpieces 1 in a through-feed process in general are machined on all 4 sides. For transporting the workpieces 1, feeding or transport rollers 2 are provided which are resting on the workpieces 1. In the infeed area, the moulder has a straightening table 3 on which the workpieces 1 are supplied to the machine. On the right side of the straightening table 3 in the infeed direction, there is an edge jointing fence 4 on which the workpiece 1 with its right longitudinal side is resting during transport. The edge jointing fence 4 is adjustable transverse to the transport direction of the workpiece 1 in order to adjust the magnitude of chip removal at the right longitudinal side of the workpiece 1. The straightening table 3 can be adjusted in vertical direction so that the magnitude of chip removal at the bottom side of the workpiece 1 can be adjusted.

The workpiece 1 passes via an infeed opening 5 into the machine. In the machine chamber a horizontal lower straightening spindle is provided on which a straightening tool 6 is fixedly secured with which, upon passage of the workpiece 1, its bottom side is machined by cutting, preferably is straightened by planing. In transport direction of the workpiece 1 downstream of the straightening tool 6, there is a vertical right spindle on which a tool 7 is seated with which in the transport direction the right longitudinal side of the workpiece 1 is machined, preferably straightened by planing. The tool 7 is a planing head with straight knives. However, a profiling tool can be provided also with which then on the right workpiece side a profile is produced.

In the transport direction of the workpiece 1, downstream of the vertical right spindle, there is a vertical left spindle on which a tool 8 is seated that is preferably a planing head with which the left workpiece side is planed straight. By machining the right and the left longitudinal sides of the workpiece, the width of the finished workpiece is generated. The tool 8 on the left side can also be a profiling tool with which a profile on the left longitudinal side of the workpiece 1 can be produced.

Upon passage through the machine, the workpieces 1 are resting on a machine table 9 which forms a transport path on which the workpieces 1, resting thereon, are transported through the machine. The machine table 9 is fast with the machine and forms the horizontal support and reference plane for the workpieces 1.

In transport direction of the workpieces 1 downstream of the right tool 7, the workpiece 1 is guided along a fence (not illustrated) father through the machine. The workpiece 1 is resting with its right machined longitudinal side on this fence which is fast with the machine and forms the vertical contact and reference plane.

In transport direction downstream of the left vertical spindle, the machine has an upper horizontal spindle on which a tool 10 is seated with which the top side of the workpiece 1 is machined upon passage through the machine. With the tool 10, the workpiece topside can be, for example, straightened by planing.

In transport direction of the workpiece 1 at a spacing behind the upper tool 10, a second upper tool 11 is rotatably driven about a horizontal axis.

In transport direction of the tool 1 at a spacing behind the upper horizontal tool 11, there is a lower horizontal spindle on which a tool 12 is fixedly seated with which the bottom side of the workpiece 1 can be machined.

The workpiece 1 which has been machined on all four sides exits through an outlet opening 13 from the machine. The described tools are located within a machine cover 14.

In the area between the two upper tools 10 and 11, a lower horizontal table roller 15 is provided. A further horizontal lower table roller 16 is located at the level of the outlet opening 13. The machine table 9 is interrupted for the two parallel positioned table rollers 15, 16. In the area of the lower tool 12 the machine table 9 is interrupted also so that machining of the workpiece bottom side by the tool 12 is possible.

Figure 3:
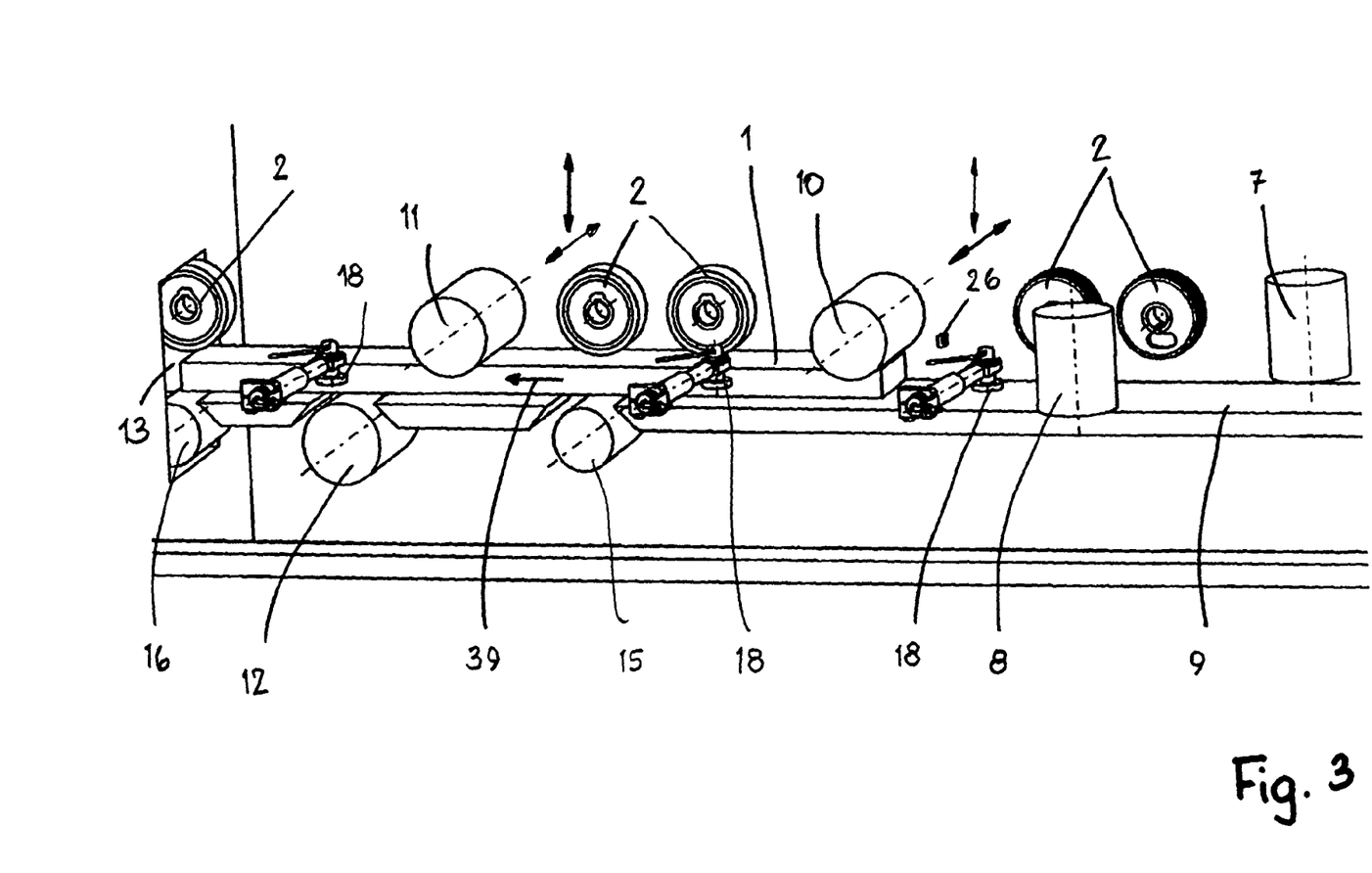
FIG. 3 a detail of FIG. 1 in enlarged illustration.

With the two upper tools 10, 11, structures can be introduced into the workpiece topside 17. For this purpose, the corresponding spindles or tool receptacles are axially and radially adjustable by CNC drives and control units as a function of the position of the workpiece 1, as indicated in FIG. 3 by the corresponding double arrows.

In order for the position of the workpiece 1 in the machine to be detected at any time, before and behind the tools 10, 11 measuring rollers 18 are provided which in the embodiment are resting on the left longitudinal side of the workpiece 1 in the transport direction and are rotated about their vertical axes in accordance with the feeding movement of the workpiece. In the illustrated embodiment, three such measuring rollers 18 are provided which are located in front of the tool 10, between the tools 10 and 11, and downstream of the tool 11.

Figure 2:
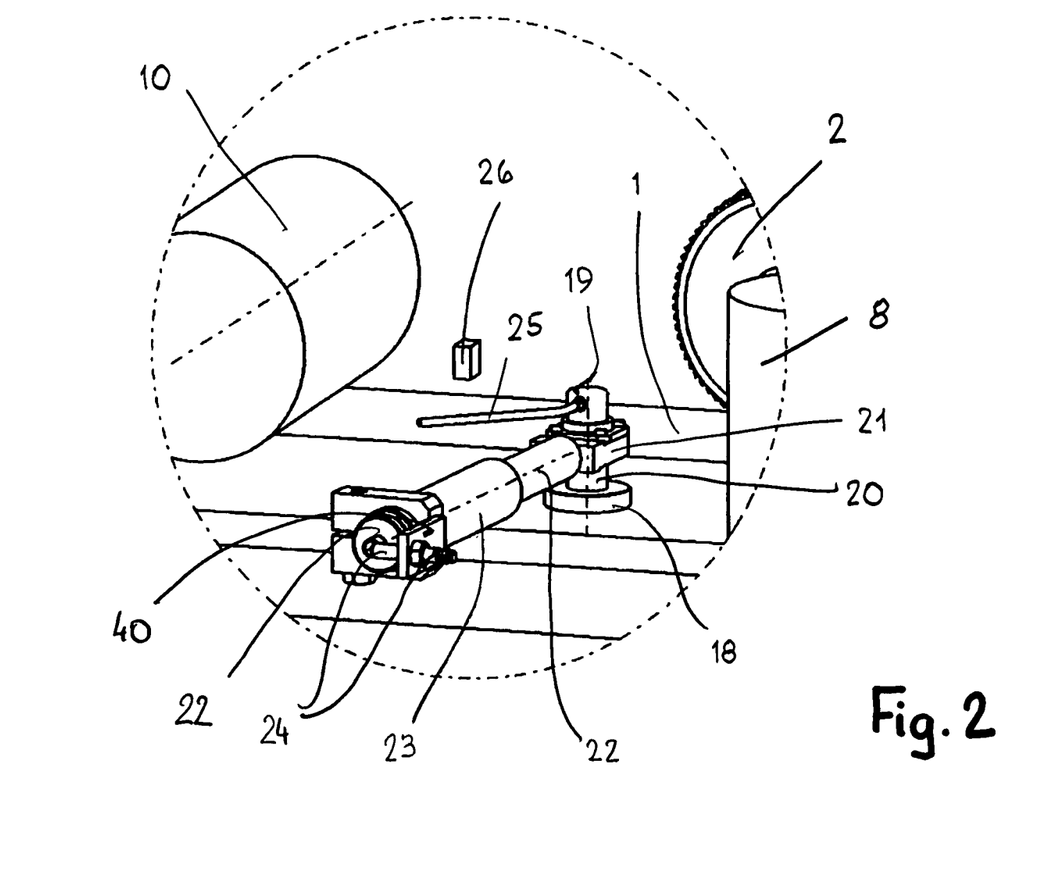
FIG. 2 the detail A of FIG. 1 in an enlarged illustration.

As shown in FIG. 2, the measuring rollers 18 are supported to be freely rotatable about a vertical axis. A vertical measuring roller carrier 20 is received in a holder 21 which is provided at a free end of a support arm 22. It is designed such that it forces the measuring roller 18 against the workpiece 1 with such a force that the measuring roller 18 is rotated reliably. The support arm 22 can be subjected to a spring force or pneumatic/hydraulic pressure so that the measuring roller 18 is always forced against the left longitudinal side of the workpiece 1. The support arm 22 is supported so as to be slidable in its longitudinal direction in a holding tube 23 which is arranged in a suitable way fast with the machine. In the illustrated embodiment, the support arm 22 is loaded by a spring force.

The measuring roller carrier 20 comprises a rotary encoder 19 that is connected fixedly to the measuring roller and supplies by a line 25 the rotary encoder signals to a machine controller.

In order to detect the leading end of the workpiece 1 and thus its exact position in the machine, a photoelectric barrier 26 is provided in the transport direction upstream of the first upper tool 10. When it is interrupted by the leading end of the workpiece 1, the sensor of the photoelectric barrier 26 sends a corresponding signal to the machine controller. This represents the starting point of the position measurement by means of the first measuring roller 18. The sensor for detecting the leading end of the workpiece is not limited to a photoelectric barrier 26 but can be any type of sensing means which is capable of detecting with the required precision and speed the leading end of a workpiece, in particular of wood, upon its transport through the machine.

As can be seen in FIGS. 4, 5, 8, and 9, different structures 27 to 29 can be introduced by means of the machine into the workpiece topside 17. The structures are advantageously first generated by means of a computer program and simulated in a computer. For this purpose, the axial and radial workpiece positions of the tools 10, 11 or of their spindles along the workpiece 1 are generated in the form of a table. This procedure is explained in the following with the aid of an example that is meant to illustrate the computation process but is not to be viewed as being limiting.

Figure 4:
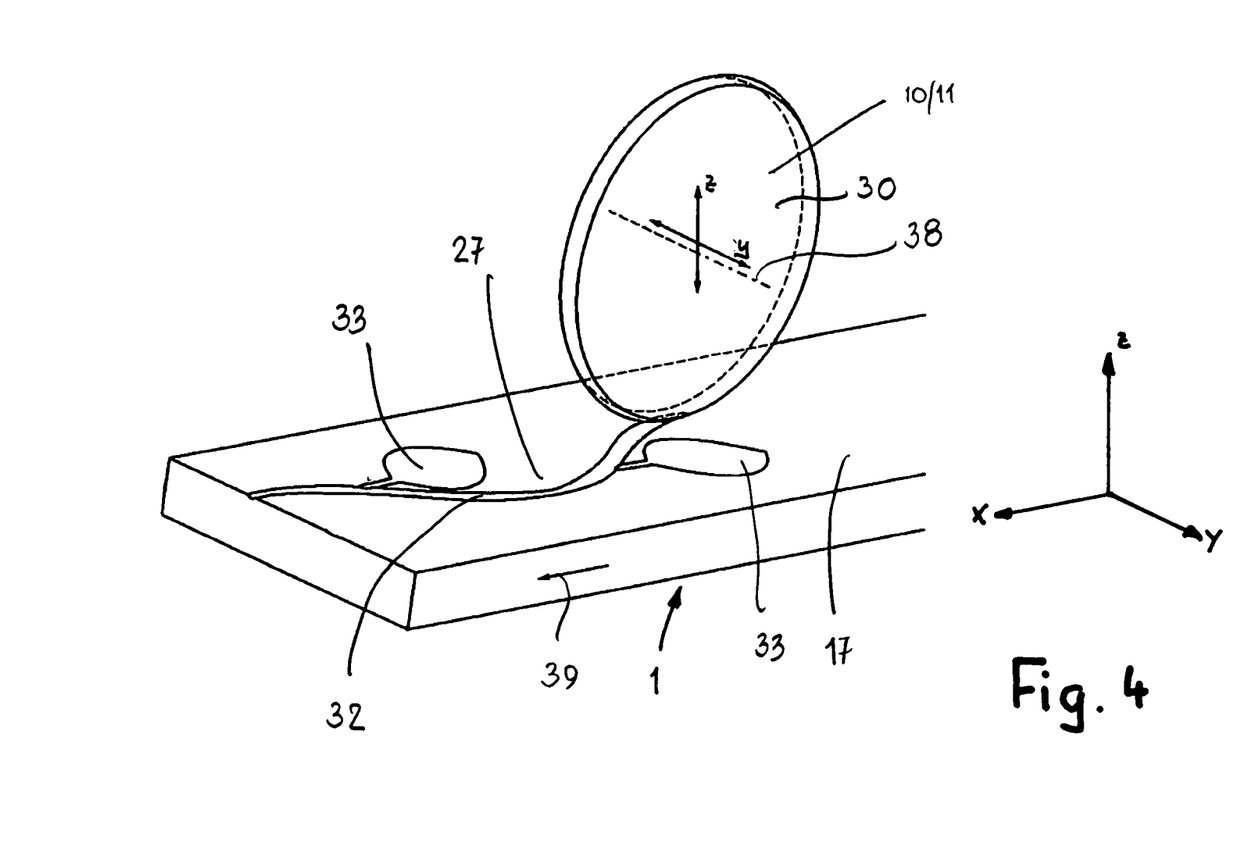
FIG. 4 in schematic illustration a tool with which a vine with leaves is produced in a workpiece.
Figure 6:
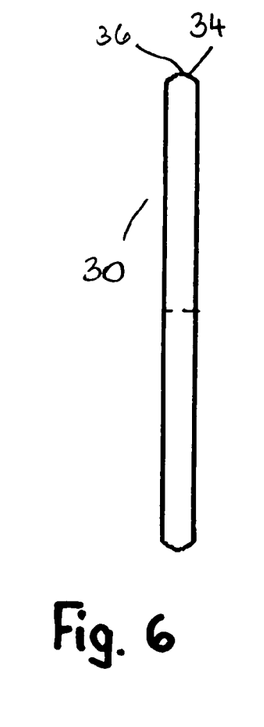
FIG. 6 a tool for producing the vine in FIG. 5.
Figure 7:
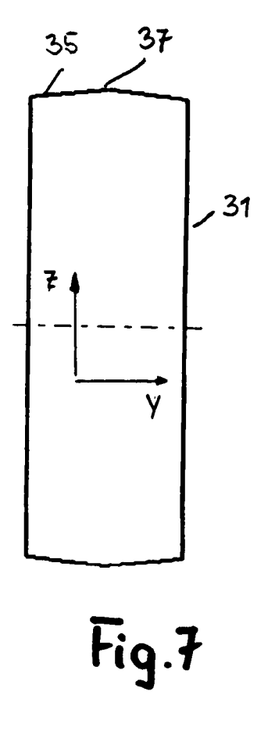
FIG. 7 a tool for producing the leaf in FIG. 5.

In a first step, the contour of the tool to be employed is described. As can be seen in FIGS. 6 and 7, the corresponding tools can be designed differently, depending on which structure is to be produced in the workpiece topside 17. The two tools 30, 31 of FIGS. 6 and 7 are used for generating the structure 27 according to FIG. 5. This structure is comprised of a vine 32 and leaves projecting away from it. As can be seen in FIG. 4, from the vine 32 several leaves 33 are projecting. The tool 30 according to FIG. 6 is employed for generating the vine 32 and the tool 31 according to FIG. 7 is employed for generating the leaves 33. The tool 30 is significantly narrower than the tool 31.

In this first step, the contour of these two tools 30, 31 is defined by a y-coordinate and a z-coordinate. The y-coordinate represents the axial and the z-coordinate the radial size of the tool 30, 31, i.e., concretely the cutting circle diameter of the respective axial position.

It should be noted that the method will be explained based on the rotation-symmetrical tools 30, 31 with which circumferential milling on the workpiece 1 is performed. The method can however also be used with other tools or machining device. Examples therefor are top spindle devices or grooving devices, fixed angle rotors in which, for example, end mill or pin routers are used, and the like. The method can also be employed on universal spindles which can be positioned at various angular positions relative to the workpiece 1. In such tools, the angle position is also taken into account as a parameter.

In the example, two tools and two spindles are provided for producing the structures 27 to 29. The number of tools/spindles participating in the process for producing the structures is however not limited.

After the contour of the tools 30, 31 has been defined by means of the z- and y-coordinates, in the next step the description of the workpiece to be manufactured is realized, inter alia with the aid of the tool position data. This description is also saved in table form. In the introduced coordinate system (see FIG. 4), the x-axis describes the feeding and longitudinal direction of the workpiece 1, the y-axis the width direction, and the z-coordinate the thickness direction of the workpiece 1. Dividing the workpiece piece length along the x-axis is done, for example, in millimeter steps but can also be realized, depending on the application, in a different raster pattern. The length of the table and its number of rows depend thus on the length of the workpiece to be machined.

Each x-position of the workpiece 1 has assigned a defined tool coordinate y or z and optionally also one or several tool angles for the corresponding spindle. In the following, a section of a table is indicated in an exemplary fashion in which for the spindles of the two tools 30, 31 the axial (y-coordinate) and the radial (z-coordinate) positional values for corresponding feeding travel (x-coordinate) of the workpiece 1 are listed.

| | Path table | | | |
|---|---|---|---|---|
| | spindle 1 | | spindle 2 | |
| Feed [mm] | axial [mm] | radial [mm] | axial [mm] | radial [mm] |
| 50 | 9.90 | 0.20 | 0.00 | 0.30 |
| 51 | 9.95 | 0.20 | −0.63 | 0.30 |
| 52 | 10.00 | 0.20 | −1.26 | 0.30 |
| 53 | 10.00 | 0.21 | −1.88 | 0.31 |
| 54 | 10.00 | 0.24 | −2.51 | 0.31 |
| 55 | 10.00 | 0.28 | −3.13 | 0.31 |
| 56 | 10.00 | 0.34 | −3.75 | 0.32 |
| 57 | 10.00 | 0.43 | −4.36 | 0.33 |
| 58 | 10.10 | 0.52 | −4.97 | 0.34 |
| . | . | . | . | . |
| . | . | . | . | . |
| . | . | . | . | . |

The axial (y-coordinate) and radial (z-coordinate) position data in the table take into consideration defined reference points of the tool, for example, the axial measure between tool contact and defined profile point and greatest cutting circle diameter, in the embodiment, for example, axial measure and cutting circle diameter of the profile tip, and of the workpiece 1, i.e., the contact of the workpiece 1 at the fence in the machine and on the machine table 9. In the embodiment with the tools 30, 31 according to FIGS. 6 and 7, the axial position of the tool tip engaging the workpiece 1 and the radial penetration depth of the tool in the workpiece in y-direction are defined in the respective x-coordinate point of the workpiece. Moreover, inasmuch as the angle position of the tool can be adjusted and is to be detected, the angle α as well as the angle β of the tool relative to the workpiece 1 can be defined so that, based on these angle values, the appropriate spindle can be positioned during machining of the workpiece in the machine.

In the described way, the coordinate values for the tools to be utilized for structuring as well as their position data at the different workpiece length positions are compiled in table form (path table). This table is saved in the memory of the computer so that subsequently a simulation can be performed by means of the computer in a way to be described in the following.

The quantity and position of the spindles or tools to be utilized for structuring the workpiece 1 is freely selectable and not limited by the employed system. Also, generating the structure is not limited to the workpiece topside as disclosed in the embodiment but, alternatively or additionally, can also be carried out at the other workpiece sides, to the right, to the left, or at the bottom. The structures 27 to 29 can be generated with all of the tools 7, 8, 10, 11, 12 that are present in the described machine. Optionally, the machine can comprise additional right, left, top or bottom tools. Moreover, also tools on universal spindles or on slanted spindles can be employed. Also, the tools of grooving devices or angled devices can be utilized for structuring the workpiece at its topside 17 or at other external sides.

The table which has been prepared as described is now utilized to link the tool geometry and the tool position data along the workpiece length in such a way with each other that the structure in the workpiece topside 17 is obtained. Since in an exemplary fashion the position and penetration depth as well as superimposing of all of the tools contributing to the process are calculated in millimeter steps row by row, the appearance of the structure in the workpiece can be pre-calculated exactly. On the computer, a simulation of the surface structuring can thus be performed by means of the values contained in the table.

The computed structure which results from the table values can also be produced visually on the screen of the computer as a 3D effect.

In the context of the simulation of the structuring process, it is checked, taking into consideration the maximum acceleration and speed limits of the machine, whether the structure can be produced with the feeding rate of the workpiece 1 defined by the user in the x-direction. The computer program can be designed such that overloading of the machine dynamics is indicated and a maximum possible feeding rate of the workpiece 1 for generating the structure is calculated.

By means of the simulation, the user is thus provided with the possibility to determine very precisely the appropriate parameters which are required later on for adjusting the tool spindles and the feeding rate of the workpiece 1.

In the simulation, the required corrections of the path curves by which the shape of the structure is determined can be done in a simple way. As soon as the simulation has been completed successfully, based on the table that is saved in the computer, a CNC program is generated and is transmitted to the machine controller.

Generating the table with the data for the tools and the tool positions can be done by individual data input in that the appropriate data are manually input for the individual steps along the workpiece. In principle, it is however also possible to carry out the data input automatically by an upstream computation algorithm, optionally with utilization and assistance of computer programs with graphic interfaces by means of which the structure can be graphically generated.

After the CNC program has been generated and has been saved in the machine controller, for example, as a path table, structuring of the workpieces 1 in the machine can be performed. The machine feed action obtains first a defined feed rate which in the described way has been determined beforehand by the simulation in the computer or, as a function of the application, is predetermined or adjusted. The feeding rate remains constant during machining for the current workpiece 1. The spindles or tools which are utilized for structuring are moved by the CNC drives and CNC control units as a function of the workpiece position into the appropriate axial and radial start positions. Upon passage of the workpiece 1 through the machine, the CNC program is executed whereby the desired structure in the workpiece surface 17 is generated In the simplest embodiment of the method, the prior simulation of the structure or contour can be omitted. In this context, the tool position data, for example, in form of the path table, are transferred to the machine controller.

In a further configuration of the machine, as a function of the geometry of the structural pattern, the feeding rate can be automatically changed and adapted to the structural pattern during the workpiece passage. In this way, advantageously the predetermined acceleration and rate limits of the machine for different structural courses can be complied with, for example, for steep contour ascends in the direction transverse to the feeding direction 39. For a change of the feeding rate, the planing step will change however, which becomes visible at the machined surfaces. When this is not acceptable depending on the application, this must be compensated by further measures, for example, by machining the relevant sides in a separate pass or by adjustment of the rotary spindle speeds of the appropriate machining spindles.

The exact workpiece position within the machine is determined by means of the photoelectric barrier 26 whose position in the machine, like the position of the machining spindles, is stationarily constructively defined and dimensionally known and serves as a reference for the remaining measuring systems. As soon as the leading end of the workpiece 1 in transport direction penetrates the photoelectric barrier 26, the position of this leading workpiece end is known and the signal that is emitted by the photoelectric barrier 26 serves as a starting point for the position measurement by means of the first measuring roller 18. During feeding of the workpiece 1, at any time the workpiece position is known relative to the tools 10, 11 utilized for structuring by utilizing the rotary encoder signals of the measuring rollers 18 so that, after the workpiece has reached the first tool 10, 11, the tools 10, 11 now perform, CNC-controlled, the programmed axial and/or radial adjusting movements as a function of the travel. The measuring rollers 18 are provided, as described, before and behind the tools 10, 11, respectively. During passage of the workpiece, the exact workpiece position is handed over by measured value handover in a cascading fashion to the measuring wheels 18 arranged sequentially by taking into consideration their relative position. The measuring wheels 18 are entrained loosely on the workpiece 1 as it is being fed. As a function of the relative position of the workpiece 1 relative to the respective tools 10, 11 or their spindles, the respective optimally suitable measuring roller 18 can be utilized as an active measuring system and the measured values of its rotary encoder can be employed as a reference variable for the spindles that are participating in the structuring process.

Changeover from one measuring roller 18 to another measuring roller 18 or its respective rotary encoder 19 (encoder changeover) is done "on the fly", without interruption of the structuring process, with the corresponding measured value handover. The number of measuring systems is not limited to two measuring rollers 18 per tool 10, 11 but, as a function of the length of the workpiece 1, can be expanded.

The use of the measuring rollers 18 driven by the workpiece 1 has the advantage that errors, which may be caused as a result of speed differences (slip) between the workpiece 1 and the feeding drive, can be prevented.

As position transducers only those measuring rollers 18 are utilized which are resting on the workpiece 1 upon its passage through the machine. This is monitored by a sensor 24 (FIG. 2). The sensor 24 is fastened to a plate-shaped holder 40 and detects the movement of the support arm 22 when the measuring roller 18 comes into contact with the workpiece 1. The support arm 22 projects through the holding tube 23 in the direction toward the sensor 24. The measuring roller 18 is arranged such that it is pushed back together with the support arm 22 when it contacts the workpiece 1. The thus caused axial movement of the support arm 22 is detected by the sensor 24 which emits a corresponding signal. Since the measuring rollers 18 in transport direction are positioned at a spacing behind each other, the measuring rollers contact sequentially the workpiece and sequentially lose contact again with the workpiece when it has been transported past them. Accordingly, switching between the rotary encoders 19 of the measuring rollers 18 occurs automatically upon passage of the workpiece. The position of the measuring rollers 18 in the machine as well as their correlation to the tools 10, 11 or their spindles and their correlation relative to each other is geometrically fixed and is taken into consideration in the evaluation and positional detection of the workpiece 1. With the rotary encoders 19 of the measuring rollers 18, in combination with the leading end of the workpiece exactly determined by the photoelectric barrier 26, the position of the workpiece within the machine can be very precisely determined so that the tools 10, 11 can produce the desired structure in the workpiece topside 17 very precisely.

In the illustration according to FIG. 1, the workpiece 1 with its leading end face has just reached the first upper tool 10. The leading end of the workpiece has already been detected by the photoelectric barrier 26 and the first measuring roller 18 is the only measuring roller 18 that is engaged with the workpiece 1. This measuring roller 18 is thus the active measuring system and supplies the appropriate measured signals to the machine controller as a reference variable for the first upper tool 10. Upon further workpiece passage through the machine, the workpiece 1 has already left the first (right) measuring roller 18 in the illustration according to FIG. 3. For machining by the tool 10, the central measuring roller 18 is employed and, for machining by the tool 11, the central or left measuring roller 18 is employed; both are resting on the workpiece 1. At the latest when the right measuring roller 18 leaves the workpiece 1, it hands over the detected value determined by the correlated rotary encoder 19 to the central measuring roller 18 that takes over this value. Based on this value, the rotary encoder 19 of the central measuring roller 18 increments the further values. At the latest when the central measuring roller 18 leaves the workpiece 1, it hands over its value to the left measuring roller 18. Then, incrementing occurs, based on the received value of the central measuring roller 18, by means of the left measuring roller. In this way, the cascading measuring value handover to the downstream measuring wheels 18 takes place. In this way, an exact knowledge of the workpiece position upon passage of the workpiece 1 through the machine is ensured. The measured value transfer or transducer changeover can already be taking place when the workpiece has reliably reached the detection area of the downstream measuring roller, at the latest however when it leaves the detection area of the preceding measuring roller so that at any time it is ensured that only one measuring roller which is in contact with the workpiece is acting as an active position indicator.

The tools 30, 31 which are utilized for structuring have a shape or profiling that is matched to the type and/or shape of the structure as is shown in an exemplary fashion with the aid of FIGS. 6 and 7. Depending on the kind of structure, the tools can have different widths. The circumferential surface 34, 35 of the tools 30, 31 are designed in axial section of such a V-shape that, at half the width, they have a circumferential edge 36, 37. The circumferential surface 34, 35 can have also any other suitable shape.

Based on FIGS. 4 and 5, in an exemplary fashion the generation of the structure 27 in the workpiece topside 17 will be explained. The employed tool 10/11 is arranged such that its horizontal axis of rotation 38 is perpendicular to the feeding direction 39 of the workpiece 1 and parallel to the topside of the workpiece 17, i.e., is positioned in the x-y plane. The tool 10/11 is moved in accordance with the program in the z- and/or y-direction relative to the workpiece 1 in order to produce the desired structure. In FIG. 4, for example, the vine 32 of the structure 27 has a curved, approximately sinusoidal course in the longitudinal direction of the workpiece 1. Accordingly, the tool 10/11 moves along the desired vine course in the y-direction. Also, by adjustment in the z-direction the depth and width of the vine 32 is determined.

Since the vine 32 is narrow, the narrow tool 30 according to FIG. 6 is utilized as a tool 10/11 for its production.

For producing the leaves 33, the wider tool 31 according to FIG. 7 is utilized. The different width of the leaf 33 is achieved in that the tool 31 penetrates more or less far in z-direction into the workpiece 1.

Figure 5:
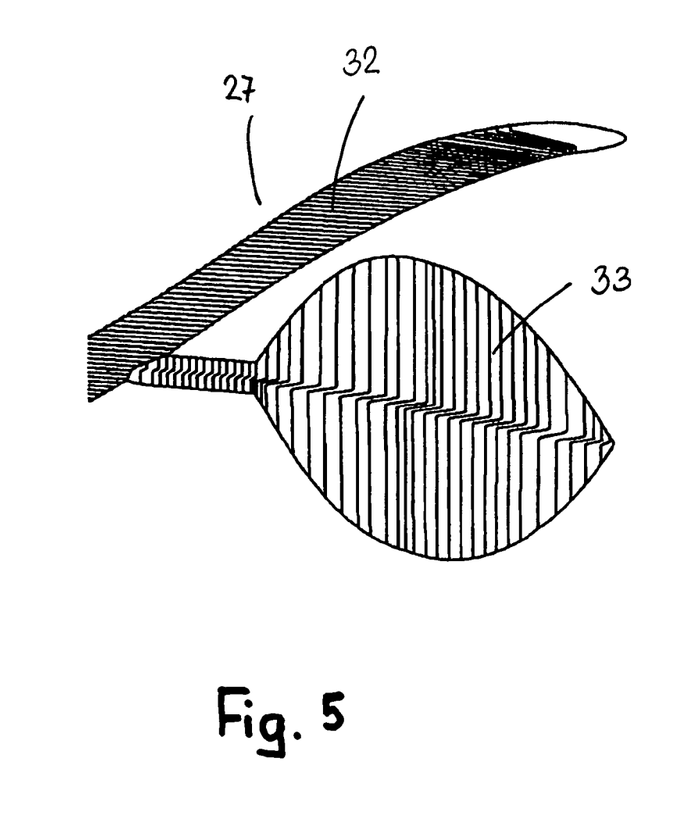
FIG. 5 in an enlarged illustration a vine and a leaf with indicated planing steps.

In FIG. 5, the planing steps are indicated which, upon generating the structure, are caused by the non-illustrated tool cutting edges of the tools 30, 31. In general, the visible planing steps are produced by the farthest projecting cutting edge of the tool 10/11 at each tool revolution. Their spacing is thus dependent on the rotary tool speed and the feeding rate. During machining of the structure, the workpiece 1 is transported continuously through the machine. The stepwise adjustment of the respective tool in the z- and/or y-direction is matched to the feeding speed of the workpiece 1 so that the structure can be produced in the desired way in the workpiece topside 17. The required feeding speed and acceleration of the respective CNC adjusting axis of the tools is calculated and preset by the control unit.

In the exemplary situation, the structure 27 is produced by two tools. In principle, one tool is however sufficient when a simple structure is concerned. However, more than two tools can be utilized for generating the structure on the workpiece topside 17.

In the illustrated embodiment, the tools rotate about horizontal axes 38 which are perpendicular to the feeding direction 39 and positioned in the x-y plane. The tool 10, 11 can moreover be designed to be pivotable about the z-axis and/or also about the x-axis so that the axis of rotation 38 extends in deviation from 90° relative to the feeding direction 39 of the workpiece 1, measured in the x-y plane, and/or extends in deviation from 0° relative to the workpiece surface (x-y plane), measured in the y-z plane, when corresponding structures are to be manufactured in the workpiece topside 17.

The displacement of the planing steps that can be seen in FIG. 5 results due to the fact that during engagement of the tool 30, 31 the workpiece 1 is moved in the feeding direction 39 and the tool 30, 31 transverse thereto.

Figures 8, 9, 10:
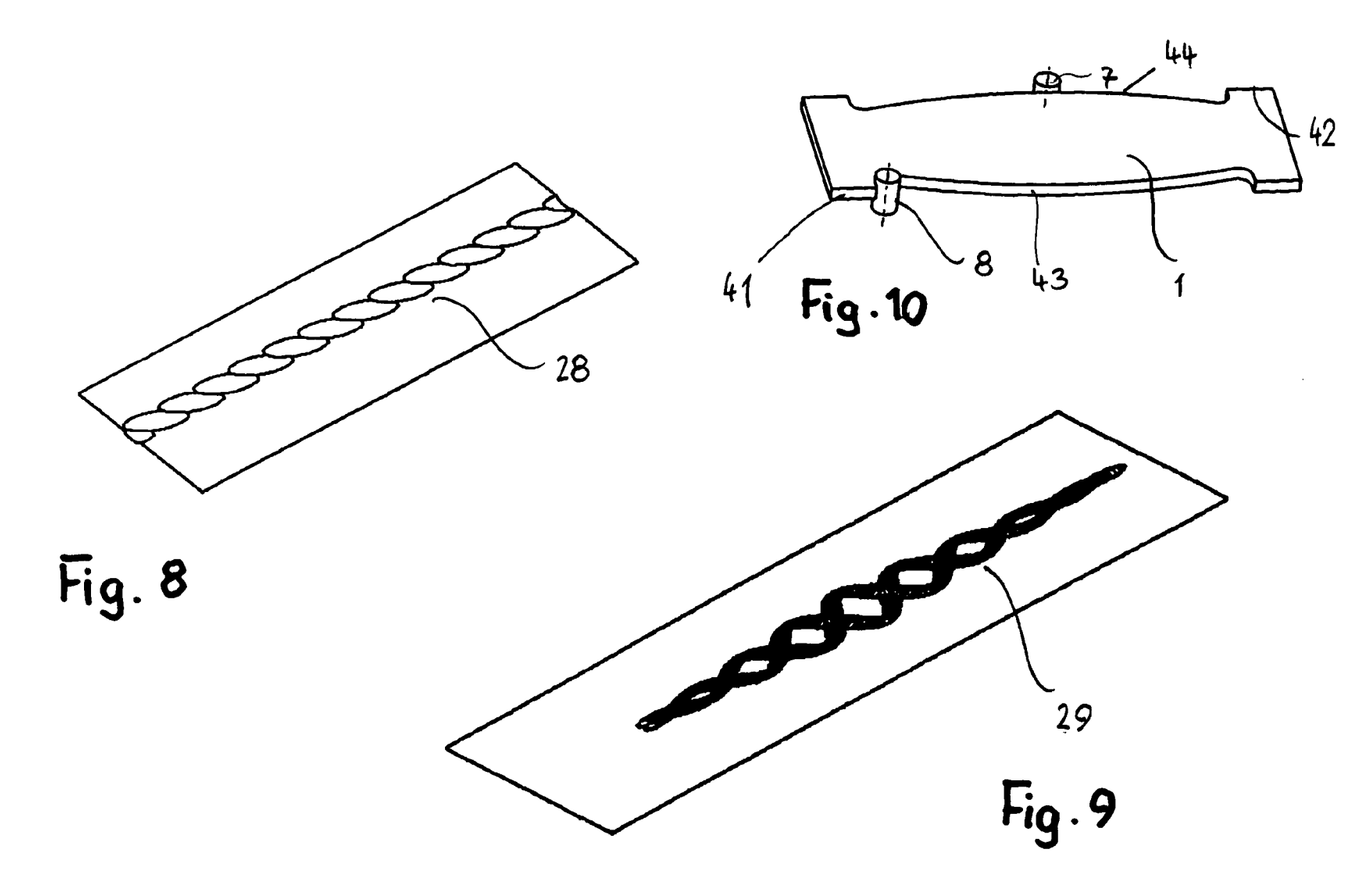

FIGS. 8 and 9 show further examples of structures 28 and 29 which can be produced in the described way in the workpiece topside 17. The structure 28 with recesses adjoining each other has, for example, visually the appearance of a helical coil rope while the structure 29 represents a type of braid pattern. For generating these two exemplary structures 28, 29, two tools on two spindles are required. With the tools it is possible to produce in a targeted fashion the different structures wherein their adjustment in the z- and y-direction is adjusted appropriately.

With the aid of FIG. 10, the possibility is described of providing the workpiece with a desired contour by means of the tools of the machine. The workpiece 1 is provided on its two longitudinal sides 41, 42 with the contour 43, 44. The course of the contours 43, 44 on two longitudinal sides in this case is generated by the tools 7 and 8 seated on the vertical spindles. As in case of the tools 10, 11, as a function of the data of the workpiece as well as of the data of the tools 7, 8, the tool positions along the workpiece 1 for generating the contours 43, 44 are defined and transmitted to the machine controller. Advantageously, the data are saved and beforehand the generation of the contour 43, 44 is performed in a simulation process with the saved data. Only after successful simulation, the saved data are transferred to the machine controller. It executes the CNC program during passage of the workpiece 1 through the machine. The respective tool 7, 8 is adjusted into the required positions by means of the CNC drives as a function of the workpiece position. The workpiece position upon passage of the workpiece 1 through the machine is also detected. Because in this embodiment the contour is generated on the right and left longitudinal side of the workpiece, the measuring elements for detecting the workpiece position are arranged advantageously on the top or bottom side of the workpiece. Producing the contour 43, 44 is thus in principle identical to producing the described structures 27 to 29.

What is claimed is:

1. A method for producing a structure or contour in a workpiece of wood or plastic material, in which in a moulder with at least one rotatably driven tool the structure or contour is produced on the workpiece by workpiece material removal, the method comprising:

defining tool positions of a tool along a length of the workpiece for generating a structure or contour, the tool positions being defined as a function of first data of the workpiece and second data of the tool;

transmitting the first and second data to a machine controller of the moulder;

executing in the machine controller a CNC (computer numerical control) program based on the first and second data as the workpiece passes through the moulder in a feeding direction;

detecting workpiece positions as the workpiece passes through the moulder in the feeding direction by:

at least one first measuring element arranged in the feeding direction upstream of the tool and connected to the machine controller and supplying signals describing a feeding travel of the workpiece to the machine controller;

at least one second measuring element arranged downstream of the tool in the feeding direction;

at least one sensor arranged in the feeding direction upstream of the tool and downstream of the at least one first measuring element, the at least one sensor detecting a leading end of the workpiece and supplying, when detecting the leading end of the workpiece, a signal to the machine controller;

using the signal of the at least one sensor as a starting point of a position measurement by the at least one first measuring element;

adjusting the tool into required positions by CNC (computer numerical control) drives as a function of the workpiece positions.

2. The method according to claim 1, wherein the second data of the tool indicate a contour of the tool.

3. The method according to claim 1, wherein the step of defining the tool positions comprises defining the tool positions in fixed steps along the length of the workpiece and saving the tool positions as a table.

4. The method according to claim 1, wherein the tool positions are defined in axial and/or radial direction of the tool.

5. The method according to claim 1, wherein the step of adjusting the tool comprises adjusting the tool into required axial and/or radial positions by means of the CNC (computer numerical control) drives as a function of the workpiece position.

6. The method according to claim 1, further comprising defining and saving an angle position of the tool relative to the feeding direction of the workpiece and relative to a surface of the workpiece to be machined.

7. The method according to claim 1, further comprising:
saving the first data of the workpiece and the second data of the tool together with the tool positions along the length of the workpiece as saved data;
in a simulation process, carrying out a simulation of generating the structure or contour with the saved data;
when the simulation is successful, transmitting the saved data to the machine controller of the moulder.

8. A method for producing a structure or contour in a workpiece of wood or plastic material, in which in a moulder with at least one rotatably driven tool the structure or contour is produced on the workpiece by workpiece material removal, the method comprising:
detecting positions of a workpiece in the moulder by measuring elements arranged in a sequence one after another along a transport path of the workpiece through the moulder and handing over measured values from a first one of the measuring elements to a second one of the measuring elements arranged downstream in the sequence, respectively, as soon as said first measuring element no longer engages the workpiece moving along the transport path.

9. The method according to claim 8, wherein a measuring element of the measuring elements is selected as an active measuring element depending on the position of the workpiece relative to a machining spindle of the tool and the position relative to the measuring elements.

10. The method according to claim 9, wherein measured values of the selected active measuring element are employed as a reference variable for tool axis adjustment of the tool.

11. A moulder for performing a method for producing a structure or contour in a workpiece of wood or plastic material, in which in a moulder with at least one rotatably driven tool the structure or contour is produced on the workpiece by workpiece material removal, the method comprising defining tool positions of a tool along a length of the workpiece for generating a structure or contour, the tool positions being defined as a function of first data of the workpiece and second data of the tool; transmitting the first and second data to a machine controller of the moulder; executing a CNC (computer numerical control) program based on the first and second data during passage of the workpiece through the moulder; detecting workpiece positions upon passage of the workpiece through the moulder; and adjusting the tool into required positions by CNC (computer numerical control) drives as a function of the workpiece positions; the moulder comprising:
a machine controller;
at least one transport path for the workpieces along which the workpieces are transported in a feeding direction through the moulder for machining;
rotatably driven tools including at least one structure-producing tool configured to produce a structure or contour in the workpiece;
a measuring element arranged in front of said at least one structure-producing tool and a measuring element arranged behind said at least one structure-producing tool, wherein the measuring elements are configured to detect a workpiece position in the moulder;
wherein the measuring elements are connected to the machine controller and supply signals, describing a feeding travel of the workpiece through the moulder, to the machine controller;
wherein the machine controller, in accordance with the signals of the measuring elements, adjusts said at least one structure-producing tool into tool positions required for machining;
wherein the measuring elements each are embodied as a measuring roller resting on the workpiece as the workpiece is fed through the moulder.

12. The moulder according to claim 11, wherein the measuring roller is rotatably driven by the workpiece.

13. The moulder according to claim 11, wherein the measuring roller is resting under pressure on the workpiece.

14. A moulder for performing a method for producing a structure or contour in a workpiece of wood or plastic material, in which in a moulder with at least one rotatably driven tool the structure or contour is produced on the workpiece by workpiece material removal, the method comprising defining tool positions of a tool along a length of the workpiece for generating a structure or contour, the tool positions being defined as a function of first data of the workpiece and second data of the tool; transmitting the first and second data to a machine controller of the moulder; executing a CNC (computer numerical control) program based on the first and second data during passage of the workpiece through the moulder; detecting workpiece positions upon passage of the workpiece through the moulder; and adjusting the tool into required positions by CNC (computer numerical control) drives as a function of the workpiece positions;
the moulder comprising:
a machine controller;
at least one transport path for the workpieces along which the workpieces are transported in a feeding direction through the moulder for machining;

rotatably driven tools including at least one structure-producing tool configured to produce a structure or contour in the workpiece;

a measuring element arranged in front of said at least one structure-producing tool and a measuring element arranged behind said at least one structure-producing tool, wherein the measuring elements are configured to detect a workpiece position in the moulder;

wherein the measuring elements are connected to the machine controller and supply signals, describing a feeding travel of the workpiece through the moulder, to the machine controller;

wherein the machine controller, in accordance with the signals of the measuring elements, adjusts said at least one structure-producing tool into tool positions required for machining;

wherein the measuring elements each comprise a rotary encoder and wherein signals generated by the rotary encoder are supplied to the machine controller.

15. A moulder for performing a method for producing a structure or contour in a workpiece of wood or plastic material, in which in a moulder with at least one rotatably driven tool the structure or contour is produced on the workpiece by workpiece material removal, the method comprising defining tool positions of a tool along a length of the workpiece for generating a structure or contour, the tool positions being defined as a function of first data of the workpiece and second data of the tool; transmitting the first and second data to a machine controller of the moulder; executing a CNC (computer numerical control) program based on the first and second data during passage of the workpiece through the moulder; detecting workpiece positions upon passage of the workpiece through the moulder; and adjusting the tool into required positions by CNC (computer numerical control) drives as a function of the workpiece positions;

the moulder comprising:

a machine controller;

at least one transport path for the workpieces along which the workpieces are transported in a feeding direction through the moulder for machining;

rotatably driven tools including at least one structure-producing tool configured to produce a structure or contour in the workpiece;

a measuring element arranged in front of said at least one structure-producing tool and a measuring element arranged behind said at least one structure-producing tool, wherein the measuring elements are configured to detect a workpiece position in the moulder;

wherein the measuring elements are connected to the machine controller and supply signals, describing a feeding travel of the workpiece through the moulder, to the machine controller;

wherein the machine controller, in accordance with the signals of the measuring elements, adjusts said at least one structure-producing tool into tool positions required for machining;

further comprising a carrier for each one of the measuring elements, wherein the carrier is adjustable transversely to the feeding direction of the workpieces.

16. The moulder according to claim 15, comprising at least one sensor associated with the carrier, wherein an adjusting movement of the carrier transversely to the feeding direction of the workpieces is detected by the at least one sensor.

17. A moulder for performing a method for producing a structure or contour in a workpiece of wood or plastic material, in which in a moulder with at least one rotatably driven tool the structure or contour is produced on the workpiece by workpiece material removal, the method comprising defining tool positions of a tool along a length of the workpiece for generating a structure or contour, the tool positions being defined as a function of first data of the workpiece and second data of the tool; transmitting the first and second data to a machine controller of the moulder; executing a CNC (computer numerical control) program based on the first and second data during passage of the workpiece through the moulder; detecting workpiece positions upon passage of the workpiece through the moulder; and adjusting the tool into required positions by CNC (computer numerical control) drives as a function of the workpiece positions;

the moulder comprising:

a machine controller;

at least one transport path for the workpieces along which the workpieces are transported in a feeding direction through the moulder for machining;

rotatably driven tools including at least one structure-producing tool configured to produce a structure or contour in the workpiece;

a measuring element arranged in front of said at least one structure-producing tool and a measuring element arranged behind said at least one structure-producing tool, wherein the measuring elements are configured to detect a workpiece position in the moulder;

wherein the measuring elements are connected to the machine controller and supply signals, describing a feeding travel of the workpiece through the moulder, to the machine controller;

wherein the machine controller, in accordance with the signals of the measuring elements, adjusts said at least one structure-producing tool into tool positions required for machining;

comprising several of the measuring elements arranged along the transport path for the workpieces at a spacing behind each other in the feeding direction.

18. The moulder according to claim 11, further comprising at least one sensor configured to detect a workpiece position of the workpiece in the moulder.

19. A moulder for performing the method according to claim 1, the moulder comprising:

at least one transport path for the workpieces along which the workpieces are transported in a feeding direction through the moulder for machining;

rotatably driven tools including at least one structure-producing tool configured to produce a structure or contour in the workpiece;

measuring elements arranged in a sequence one after another along a transport path for the workpiece through the moulder and positioned at a spacing relative to each other along the transport path for the workpieces;

wherein the measuring elements are operatively connected such that a first one of the measuring elements hands over measured values to a second one of the measuring elements arranged downstream in the sequence respectively, as soon as said first measuring element no longer engages the workpiece moving along the transport path.

20. The moulder according to claim 19, further comprising at least one sensor configured to detect a workpiece position of the workpiece in the moulder.

* * * * *